United States Patent [19]

Gainer et al.

[11] Patent Number: 4,966,920

[45] Date of Patent: Oct. 30, 1990

[54] SMOKE AND TOXIC GAS SUPPRESSANT COMPOSITION

[75] Inventors: James Gainer; Robert L. Bentley, both of Manchester, England

[73] Assignee: Ciba-Geigy Corporation, Ardsley, New York

[21] Appl. No.: 299,165

[22] Filed: Jan. 19, 1989

[30] Foreign Application Priority Data

Jan. 23, 1988 [GB] United Kingdom ............... 8801525

[51] Int. Cl.$^5$ ............................................. C08G 18/14
[52] U.S. Cl. ..................................... 521/99; 521/103; 521/105; 521/106; 521/107; 521/119; 521/122; 521/123; 521/125; 521/128; 521/132; 521/137; 524/701; 524/706; 524/718; 524/779; 524/780; 524/786; 525/440
[58] Field of Search ............... 521/137, 99, 103, 105, 521/106, 107, 119, 122, 123, 125, 128, 132; 524/700, 701, 706, 718, 779, 780, 786; 525/440

[56] References Cited

U.S. PATENT DOCUMENTS 4,511,688 4/1985 Termine et al. ..................... 521/106

FOREIGN PATENT DOCUMENTS

| 0075424 | 3/1983 | European Pat. Off. |
| 977705 | 12/1964 | United Kingdom. |
| 1009107 | 11/1965 | United Kingdom. |
| 2034726 | 6/1980 | United Kingdom. |
| 1584614 | 2/1981 | United Kingdom. |
| 2059976 | 4/1981 | United Kingdom. |
| 2102824 | 2/1983 | United Kingdom. |

Primary Examiner—Maurice J. Welsh

[57] ABSTRACT

The present invention provides a composition comprising a combustible material containing urethane linkages; and as a smoke and toxic gas suppressant, a polyester which has an acid value below 30 mg KOH/g, preferably below 10 mg KOH/g, and which is derived from:

Ia.[A] a component which contains 4 carboxyl groups or anhydride thereof, and which is preferably an aromatic component, or Ib. a mixture of [A] and [B]:

[B] one or more components which contain 2 to 12, preferably 2 to 4, carboxyl groups or 1 to 6, preferably 1 or 2, carboxylic anhydride groups, selected from:

[B$_1$] an aliphatic carboxylic acid compnent containing 2-16 carbon atoms; [[B$_2$] a cyclic non-aromatic carboxylic acid containing 7-17 carbon atoms; and

[B$_3$] an aromatic carboxylic acid containing 8-16 carbon atoms; and

II.[C] at least one aliphatic, cycloaliphatic or aromatic polyhydroxyl component containing 2 to 8 hydroxyl groups, and the amount of polyester is from to 50 100% based on the weight of polyol used to make the combustible material.

23 Claims, 6 Drawing Sheets

SMOKE AND TOXIC GAS SUPPRESSANT COMPOSITION

The present invention relates to the suppression of the formation of smoke and toxic gases in the combustion of natural and synthetic polymeric materials, especially those containing isocyanate moieties, such as flexible and rigid polyurethane foams which are used in furnishings, transport, decorations, insulation and building structures.

Carboxylic acids are well known char-forming systems and are claimed to be useful as smoke suppressant additives in this context. However. acidic compounds react with components which are used in polyurethane manufacture and are very difficult to incorporate into a polyurethane foam, in particular flexible polyurethane foams, and so are unattractive to the foam manufacturer.

Esters of polycarboxylic acid systems are disclosed in EP 75 424 as smoke suppressant additives for polyurethane foams, but only when used in conjunction with other components. Furthermore, esters of polycarboxylic acids derived from simple monohydric alcohols do not reduce the smoke levels on combustion of the foam.

Surprisingly, we have found that certain polyesters significantly reduce both the rate of formation and the levels of smoke and toxic gases on combustion of the polyurethane foam. Furthermore, these polyesters act alone and do not need the addition of other components. In addition, the polyesters of the present invention can be readily incorporated into the polyurethane foam under normal manufacturing conditions.

Accordingly, the present invention provides a composition comprising a combustible material containing urethane linkages; and as a smoke and toxic gas suppressant, a polyester which has an acid value below 30 mgKOH/g, preferably below 10 mgKOH/g, and which is derived from:

I. [A] a component which contains 4 carboxyl groups or anhydride thereof, and which is preferably an aromatic component, and optionally:

[B] one or more components which contain 2 to 12, preferably 2 to 4 carboxyl groups, or 1 to 6, preferably 1 or 2 carboxylic anhydride groups, selected from:

[$B_1$] an aliphatic carboxylic acid component containing 2-16 carbon atoms;

[$B_2$] a cyclic non-aromatic carboxylic acid containing 7-16 carbon atoms; and

[$B_3$] an aromatic carboxylic acid containing 8-16 carbon atoms; and

II. [C] at least one aliphatic, cycloaliphatic or aromatic, preferably aliphatic polyhydroxyl component containing 2 to 8, preferably 2 to 4 hydroxyl groups.

The acid component [A] may be aromatic. Examples of suitable aromatic acid components [A] include pyromellitic acid, naphthalene tetracarboxylic acid, 3,3',4,4'-benzophenonetetracarboxylic acid, 3,3',4,4'diphenyltetracarboxylic acid, 3,3',4,4'-diphenyl ether tetracarboxylic acid, 3,3'4,4'-diphenyl sulphone tetracarboxylic acid, related anhydrides and halogenated derivatives thereof.

The acid component [A] may also be cyclic non-aromatic, such as tetrahydrofuran tetracarboxylic acid or anhydrides thereof, or aliphatic, such as ethylenediamine tetracetic acid or anhydrides thereof.

The preferred acid of component [A] is aromatic and most preferred is pyromellitic acid or pyromellitic dianhydride.

Aliphatic carboxylic acid component [$B_1$] may be saturated or unsaturated and may be unsubstituted or substituted with one or more halogen, hydroxyl or amino groups. Examples of suitable aliphatic acids include oxalic, malonic, succinic, glutaric, adipic, commercially available mixtures of dicarboxylic acids e.g. AGS (mixtures of adipic, glutaric and succinic acids), pimelic, azelaic, sebacic, malic, tartaric, citric, dibromosuccinic, ethylenediamine tetracetic, maleic, fumaric, itaconic, $\alpha$-methyleneglutaric, dichloromaleic, polymaleic acid and related anhydrides. The preferred aliphatic acids of component [$B_1$] are saturated aliphatic or hydroxy-substituted saturated aliphatic or unsaturated aliphatic carboxylic acids, especially dicarboxylic acids; most preferred are maleic, fumaric, itaconic, adipic acids or adipic acid in admixture with other dicarboxylic acids, and malic acid.

Cyclic non aromatic acid component [$B_2$] may be interrupted by an —O— atom or substituted by one or more ketone groups. Examples of suitable acids include cyclopentane or cyclohexane polycarboxylic acids, cyclopentanone or cyclohexanone polycarboxylic acids, tetrahydrofuran polycarboxylic acid and related anhydrides. The preferred cyclic non-aromatic component [$B_2$] contains four carboxyl groups; most preferred is tetrahydrofuran tetracarboxylic acid.

Aromatic acid component [$B_3$] contain 2 to 4 carboxyl groups, preferably 2 carboxyl groups, and may be unsubstituted or substituted by one or more halogen atoms. Examples of suitable acids include phthalic, isophthalic, terephthalic, naphthalene dicarboxylic, trimellitic, naphthalene tetracarboxylic, 3,3',4,4'-benzophenonetetracarboxylic, 3,3',4,4'-diphenyltetracarboxylic, related anhydrides and halogenated derivatives thereof e.g. 3,5,6-tribromotrimellitic acid or anhydride. The preferred aromatic acid component [$B_3$] is phthalic-, isophthalic- or terephthalic acid.

The polyhydroxyl component [C] may be aliphatic, cycloaliphatic or aromatic, optionally substituted with one or more halogen atoms.

The polyhydroxyl component [C] may be a saturated aliphatic polyol containing from 2 to 52 carbon atoms and from 2 to 4 hydroxyl groups or a cycloaliphatic alcohol containing from 6 to 10 carbon atoms and from 2 to 6 hydroxyl groups.

Examples of suitable aliphatic component [C] include diols, e.g. ethylene glycol, propylene glycol, 1,4-butane diol, 1,6-hexanediol, 1,10-decane diol, or diethylene glycol, and polyether diols e.g. polyethylene glycol 200, polyethylene glycol 400, polyethylene glycol 600, polyethylene glycol 1000, polypropylene glycol 200, polypropylene glycol 425, polypropylene glycol 700, polypropylene glycol 1000 and dibromoneopentyl glycol. Examples of suitable aliphatic polyhydroxyl containing component [C] include trimethylolethane, trimethylol propane, 1,2,6-hexane-triol, glycerol, pentaerythritol and dibromoneopentyl glycol.

Examples of suitable cycloaliphatic polyol component [C] are bis(1,2- or 1,4-hydroxymethyl)cyclohexane, 2,2,6,6-tetrahydroxymethyl cyclohexanone or 1,2,2,6,6-pentahydroxymethyl cyclohexane.

Examples of suitable aromatic diol component [C] include catechol, resorcinol, dihydroquinone, naphthalene diols, anthraquinone diols, bis(1,2- or 1,4-hydroxymethyl) benzene, diphenyl-4,4'-dimethanol and halogenated derivatives thereof.

The preferred component [C] is an aliphatic component, especially which contains from 2 to 6 carbon atoms; most preferred is an aliphatic diol or polyether diol.

The polyesters may be prepared by conventional procedures known to those skilled in the art, such as esterification or transesterification. Thus a polycarboxylic acid or anhydride may be reacted with a diol or polyol at a temperature from 20° C. to 300° C. using the diol or polyol as solvent, or in the presence of another suitable solvent such as methyl ethyl ketone, tetrahydrofuran or xylene. The reaction may be performed in the presence of a catalyst such as tin or titanium alkoxides, N-methylimidazole, triethylene diamine, triphenyl phosphine, p-toluenesulfonic acid or other catalysts known to those skilled in the art. If desired, an alcohol, a monobasic acid or an acid chloride may be used as an end stopper in conventional manner.

The smoke suppressant polyesters of the present invention can be utilized in various basic materials, but they are especially suited to materials incorporating isocyanate linkages, particularly polyisocyanurates and polyurethanes, preferably polyurethane foams, notably the flexible or rigid foams commonly based on toluene diisocyanate (TDI) and diphenyl- methane-4,4'-diisocyanate (MDI), and especially, the flexible foams, usually based on TDI, which are employed in modern furnishings, fixtures and fittings. These polyurethanes, can be based, for example, on both polyether or polyester polyols, trialkanolamines, and aminic polyols, e.g. those derived from alkylene oxide adducts of amines and ammonia. They may incorporate various blowing agents such as water, carbon dioxide and perhalohydrocarbons, such as methylene chloride, liquified gases which have boiling points below 27° C. and above 15° C., or other inert gases, such as nitrogen, carbon dioxide added as such, methane, helium, and argon. Suitable initially liquified gases include aliphatic and cycloaliphatic fluorocarbons which vaporize at or below the temperature of the foaming mass. Such gases are at least partially fluorinated and may also be otherwise halogenated. Illustrative of the preferred fluorocarbon blowing agents are trichloromonofluoromethane, dichlorodifluoromethane, 1,1-dichloro-1-fluoroethane, hexafluorocyclobutane and octafluorocyclobutane. Other adjuvants (or residues thereof) which may be incorporated include catalysts, e.g. tin compounds such as stannous octoate, dibutyl tin acetate, and dibutyl tin laurate, surfactants and emulsifiers such as substituted nonyl phenols, fatty acid/ethylene oxide condensates, alkylene oxide block copolymers or silicon-containing compounds such as poly(dimethylsiloxanes) or poly(phenylmethylsiloxanes) or poly(dimethylsiloxane)-polyoxyalkylene graft copolymers, as well as preferably fire-retardants; examples of preferred fire-retardants include hydrated aluminas, magnesium hydroxide, halogen- and/or phosphorus-containing compounds including metal salts of phosphonic acids, antimony oxides, boron-containing compounds such as borax, graphite, e.g. exfoliated graphite, ceramics or melamine or its derivatives such as melamine salts. Suitable melamine salts include melamine borate, melamine cyanurate, dimelamine phosphate, melamine phosphonates, melamine sulphonates, and melamine carboxylates such as melamine phthalate, melamine stearate and melamine oxalate. When a fire retardant is used the ratio of polyester to fire retardant in the combustible material may be from 10:90 to 90:10 by weight. If desired, intumescent-generating ingredients e.g. ammonium polyphosphates may be included in the formulation.

Apart from tin compounds, the catalyst preferably comprises an amine. Suitable amine catalysts include one or more of the following: N,N'-dimethylcyclohexylamine, methyl dicyclohexylamine, N-methylmorpholine, N-ethylmorpholine, N-octadecylmorpholine, triethylamine, tributylamine, trioctylamine, N,N,N',N'-tetramethylenediamine, N,N,N',N'-tetra- methyl-1,3-butane-diamine, triethanolamine, N,N-dimethylethanolamine, triisopropanolamine, N-methyl-diethanolamine, bis(2-di-methylaminoethyl)ether, hexadecyldimethylamine, N,N-dimethylbenzylamine, trimethylamine, triethylenediamine (i.e. 1,4-diazabicyclo[2.2.2-octane]), the formate and other salts of triethylenediamine or oxyalkylene adducts of the amine groups of primary and secondary amines and other such amine catalysts which are well known in the art of polyurethane manufacture.

The polyesters may be incorporated by mixing with the polyol formulation used to make the polyurethane before it is mixed with the isocyanate component. The amount of polyester may be from 5 to 100 % based on the weight of polyol used, preferably from 10 to 30 %.

The compositions of the present invention may be used in a wide variety of products such as chairs, settees, stools and various other forms of seating, matresses, cushions, pillows, foam backing for carpets, curtains and textile composites as well as foams for thermal and sound insulations. In such applications they will often be used in composites or assemblies with a wide range of other materials including natural and synthetic textiles for example leather, cotton, wool, polyester, polyamide, acrylic, polyvinylchloride, polypropylene, viscose velour; supplementary padding, interlinings, webbing, barriers and other various materials of construction such as wood, metals, plastics, plasterboard, glass fibres etc. In addition other measures to reduce flammability, smoke and toxic gas evolution may also be included such as the use of interliners, barrier foams and flame retarded textiles.

The following Examples illustrate the invention.

EXAMPLE 1

763 g (3.5 mole) pyromellitic dianhydride and 3710 g (35 mole) diethylene glycol are charged to the reaction vessel fitted with an efficient stirrer and heated slowly to 200° C. (±5° ) under a stream of nitrogen gas. The mixture is heated at this temperature and water of condensation is distilled from the reaction mass at a head temperature of 100° C. (±5° ). The reaction is monitored by acid value determinations. At acid value 20 mg KOH/g, 2.4 g dibutyl tin oxide is added and heating is continued until the acid value reaches 5 mg KOH/g. Excess diethylene glycol is removed under reduced pressure to give 1973 g of product, acid value 8.3 mg KOH/g, as a brown viscous oil.

EXAMPLES 2 to 29

The procedure given in Example 1 is repeated using the reactants as set out in Table 1. Where a mixture of acids or anhydride is shown a 1:1 molar mixture is used. In Example 4 sufficient 2-ethylhexanol is used to reduce the acid value to 8.0 mg KOH/g.

TABLE 1

| Example | Reaction Components [A] Acid [B] | Polyol [C] | Acid Value (mg KOH/g) |
|---|---|---|---|
| 2 | PMDA | EG | 3.0 |
| 3 | PMDA | PEG 200 | 23.0 |
| 4 | PMDA | PEG 200 + 2-ethyl-hexanol | 8.0 |
| 5 | PMDA | PEG 1000 | 4.2 |
| 6 | PMDA | PG | 28.0 |
| 7 | PMDA | PPG 425 | 15.0 |
| 8 | PMDA | EG + PG | 2.6 |
| 9 | PMDA | PPG 425 + PPG 1000 | 11.0 |
| 10 | PMDA + MA | EG | 2.0 |
| 11 | PMDA + MA | EG + PG | 12.0 |
| 12 | PMDA + MA | EG + PPG 425 | 2.4 |
| 13 | PMDA + TMA | PEG 200 | 5.0 |
| 14 | PMDA + Malic acid | EG | 3.6 |
| 15 | PMDA + Succinic acid | EG | 3.0 |
| 16 | PMDA + Succinic acid | DEG | 4.8 |
| 17 | PMDA + Adipic acid | DEG | 3.8 |
| 18 | PMA | DEG | 2.8 |
| 19 | PMA + Malic acid | DEG | 5.2 |
| 20 | PMA + Succinic acid | DEG | 3.2 |
| 21 | PMA + Adipic acid | DEG | 5.2 |
| 22 | THF-DA | PEG 200 | 1.0 |
| 23 | BP-DA | PEG 200 | 9.5 |
| 24 | EDTA | EG | 6.2 |
| 25 | PMA + Adipic acid | PG | 3.8 |
| 26 | PMA + Adipic acid | PPG 425 | 4.9 |
| 27 | BP-DA + Adipic acid | DEG | 7.2 |
| 28 | THFTA + Adipic acid | DEG | 12.3 |
| 29 | DPD + Adipic acid | DEG | 0.8 |
| 30 | PMA | PPG 425 | 11.0 |
| 31 | PMA | PEG 200 | 18.0 |
| 32 | PMA + Adipic acid | DBNPAG | 8.7 |
| 33 | PMA + DBS | DEG | 10.4 |

PMDA = Pyromellitic dianhydride
MA = Maleic anhydride
TMA = Trimellitic anhydride
PMA = Pyromellitic acid
TMAC = Trimellitic acid
THF-DA = Tetrahydrofuran dianhydride
BP-DA = Benzophenone dianhydride
EDTA = Ethylenediamine tetracetic acid
THFTA = Tetrahydrofuran tetracarboxylic acid
DPD = Diphenyl dianhydride
EG = Ethylene glycol
PEG = Polyethylene glycol
PG = Propylene glycol
PPG = Polypropylene glycol
DEG = Diethylene glycol
DBNPG = Dibromoneopentyl glycol
DBS = Dibromosuccinic acid PMDA = Pyromellitic dianhydride MA = Maleic anhydride TMA = Trimellitic anhydride PMA = Pyromellitic acid TMAC = Trimellitic acid THF-DA = Tetrahydrofuran dianhydride BP-DA = Benzophenone dianhydride EDTA = Ethylenediamine tetracetic acid THFTA = Tetrahydrofuran tetracarboxylic acid DPD = Diphenyl dianhydride EG = Ethylene glycol PEG = Polyethylene glycol PG = Propylene glycol PPG = Polypropylene glycol DEG = Diethylene glycol DBNPG = Dibromoneopentyl glycol DBS = Dibromosuccinic acid The effectiveness of the polyester composition in reducing the levels of smoke and toxic gas evolved from burning flexible polyurethane foam is illustrated by the following Examples.

EXAMPLE 34

A flexible polyurethane foam is prepared using the following formulation.

| | Parts by weight |
|---|---|
| Polyether polyol[1] | 100.0 |
| Water | 4.7 |
| N,N-dimethylethanolamine | 0.4 |
| Stannous octoate | 0.25 |
| Silicone surfactant[2] | 1.0 |
| Toluenediisocyanate 80:20 (TDI) | 55.5 |

Caradol ® 48/2 ex Shell Chemicals
Polyurax ® SC 246 ex BP Chemicals.

The polyol, water, N,N-dimethylethanolamine and silicone surfactant are blended together using a four-bladed impeller at 2000 rpm.

The stannous octoate is added and stirred for five seconds. Finally preweighed TDI is added rapidly. The mixture is blended for 5 seconds then poured into a mould. The foam is allowed to rise then is stored for 24 hours at 23° C. and 50% relative humidity.

The foam is cut into cubes weighting 5 g (±0.2 g) and the amount of smoke produced on burning is measured as follows using a standard Aminco NBS Smoke Chamber described in ASTM E662 but using a modified test procedure. The foam sample is placed on a wire gauze supported on a tripod within the smoke chamber and ignited with a match. Each foam sample is tested in triplicate. The mean specific optical density is calculated at times of one minute ($D_1$), two minutes ($D_2$) and three minutes ($D_3$) from the time of ignition. The mean maximum specific optical density corrected for soot deposition on the lenses [Dmax (corr)] is also recorded. The results are given in Table 2.

EXAMPLES 35 to 64

Samples of flexible polyurethane foam containing the polyester compositions of the present invention are prepared using the method of Example 34 with the appropriate amount of the polyester composition being blended into the mixture prior to the addition of the stannous, octoate and TDI. The amounts used are shown in Table 2 as parts per hundred parts of polyol(php).

Although the said polyester compositors can be used without the need for any substantial changes to this formulation, those skilled in the art will appreciate that small modifications e.g. to catalyst levels, may be made to control the properties of the foam produced.

Samples of the resulting foam are prepared and tested followed the procedure described in Example 34 and the values of optical density thus obtained, are given in Table 2.

TABLE 2

| Example No. | Product of Example | Amount (php) | $D_1$ | $D_2$ | $D_3$ | Dmax (corr) |
|---|---|---|---|---|---|---|
| 34 | Control | — | 87 | 87 | 87 | 84 |
| 35 | 1 | 20 | 16 | 48 | 60 | 60 |
| 36 | 2 | 20 | 11 | 42 | 54 | 61 |
| 37 | 3 | 20 | 18 | 40 | 43 | 45 |
| 38 | 4 | 20 | 8 | 50 | 75 | 76 |
| 39 | 5 | 20 | 17 | 42 | 51 | 51 |
| 40 | 6 | 20 | 18 | 33 | 36 | 40 |
| 41 | 7 | 20 | 45 | 63 | 65 | 63 |
| 42 | 8 | 20 | 27 | 50 | 53 | 56 |
| 43 | 9 | 20 | 43 | 64 | 64 | 64 |
| 44 | 10 | 20 | 11 | 312 | 47 | 55 |

TABLE 2-continued

| Example No. | Product of Example | Amount (php) | Optical Densites D₁ | D₂ | D₃ | Dmax (corr) |
|---|---|---|---|---|---|---|
| 45 | 11 | 20 | 16 | 36 | 53 | 55 |
| 46 | 12 | 20 | 26 | 69 | 75 | 71 |
| 47 | 12 | 30 | 24 | 32 | 48 | 50 |
| 48 | 13 | 20 | 6 | 40 | 64 | 66 |
| 49 | 14 | 30 | 18 | 48 | 57 | 55 |
| 50 | 15 | 30 | 17 | 41 | 48 | 45 |
| 51 | 16 | 20 | 16 | 45 | 58 | 58 |
| 52 | 17 | 20 | 20 | 54 | 64 | 64 |
| 53 | 18 | 20 | 6 | 54 | 58 | 58 |
| 54 | 19 | 20 | 36 | 53 | 53 | 53 |
| 55 | 20 | 20 | 34 | 62 | 66 | 66 |
| 56 | 21 | 20 | 18 | 45 | 51 | 50 |
| 57 | 22 | 20 | 13 | 32 | 60 | 60 |
| 58 | 23 | 20 | 11 | 39 | 64 | 71 |
| 59 | 24 | 20 | 19 | 55 | 62 | 61 |
| 60 | 25 | 30 | 25 | 50 | 50 | 56 |
| 61 | 26 | 30 | 25 | 69 | 70 | 71 |
| 62 | 27 | 30 | 20 | 48 | 55 | 55 |
| 63 | 28 | 30 | 14 | 34 | 36 | 38 |
| 64 | 29 | 30 | 13 | 39 | 47 | 56 |

The results given in Table 2 show that incorporation of the polyesters of the invention into the flexible polyurethane foam (Examples 35-64) reduces the total amount of smoke formed during combustion compared to the untreated foam (Example 34) as measured by Dmax (corr). Additionally, the polyesters have the effect of significantly reducing the rate at which the smoke is produced as measured by the values of optical density after 1, 2 and 3 minutes ($D_1$, $D_2$ and $D_3$).

EXAMPLES 65–73

Machine-made samples of flexible polyurethane foam were prepared using the formulations in Table 3.

TABLE 3

| Formulation | A | B | C |
|---|---|---|---|
| Caradol ® 48/2 | 100.0 | 100.0 | 100.0 |
| Water | 4.7 | 4.7 | 4.7 |
| N,N-dimethylethanolamine | 0.6 | 0.6 | 0.6 |
| Stannous octoate | 0.2 | 0.2 | 0.1 |
| Polyurax ® SC 246 | 1.0 | 1.0 | 1.0 |
| Refrigerant 11 | — | — | 5.0 |
| TDI (80:20) | 55.5 | 55.5 | 55.5 |
| Polyester of Example 1 | — | — | 30.0 |
| Polyester of Example 12 (dissolved in 20% by weight of dichloromethane) | — | 30.0 | — |
| Foam Density Kg·m⁻³ | 23 | 25 | 24 |

Samples of each foam were cut into cushions. A seat cushion of 45 × 50 × 10 cm, a back-rest of 45 × 50 × 10 cm and two arm rests of 45 × 25 × 10 cm were assembled into a chair shape and supported on a steel chair frame. THe seat and back-rest cushions were supported on solid mineral board sheeting. The foam was tested uncovered and with either viscose velour or polypropylene covers as listed in Table 4. In the case of the polypropylene covered foam, only two cushions (back-rest and one arm-rest) were burnt.

The assembled chairs were positioned in a Fire Test facility which consisted of a Chamber (4 m × 3 m × 3.5 m) opening into a corridor (12 m × 1.2 m × 2.5 m). Doors with adjustable louvres were fitted at the end of the Corridor and the outside entrance to the Test Chamber, and these doors were used to control ventilation to the sample in the Test Chamber. An Observation Room was placed so it was possible to photograph the Test Chamber during experiments and to take remote measurements of gas concentrations and smoke obscuration. Additional viewing ports in the external walls were provided for observation.

A number 5 crib as described in British Standard BS 5852 was used as the ignition source placed at the back of the seat cushion adjacent to the back-rest. A match was used to ignite the crib.

The smoke generation from the chairs was measured by using a vertically-mounted light link consisting of a incandescent tungsten light source and a silicon chip photo-cell, with their respective collimating and focussing lenses. The output voltage from the system was monitored continuously using a computerised data logging system. The relationship between output voltage and optical density of the medium causing obscuration in the light path of the system was determined by calibration with standard neutral density filters. Measurements were made at the door between the Corridor and the Chamber and in the Corridor. The measurements were made in terms of optical density (D), a unit derived from Beer's Law and expressed as $D = \log_{10} F_0/F$ where $F_0$ = light intensity at the photocell in the absence of smoke F = light intensity at the photocell in the presence of smoke.

Figure 1:
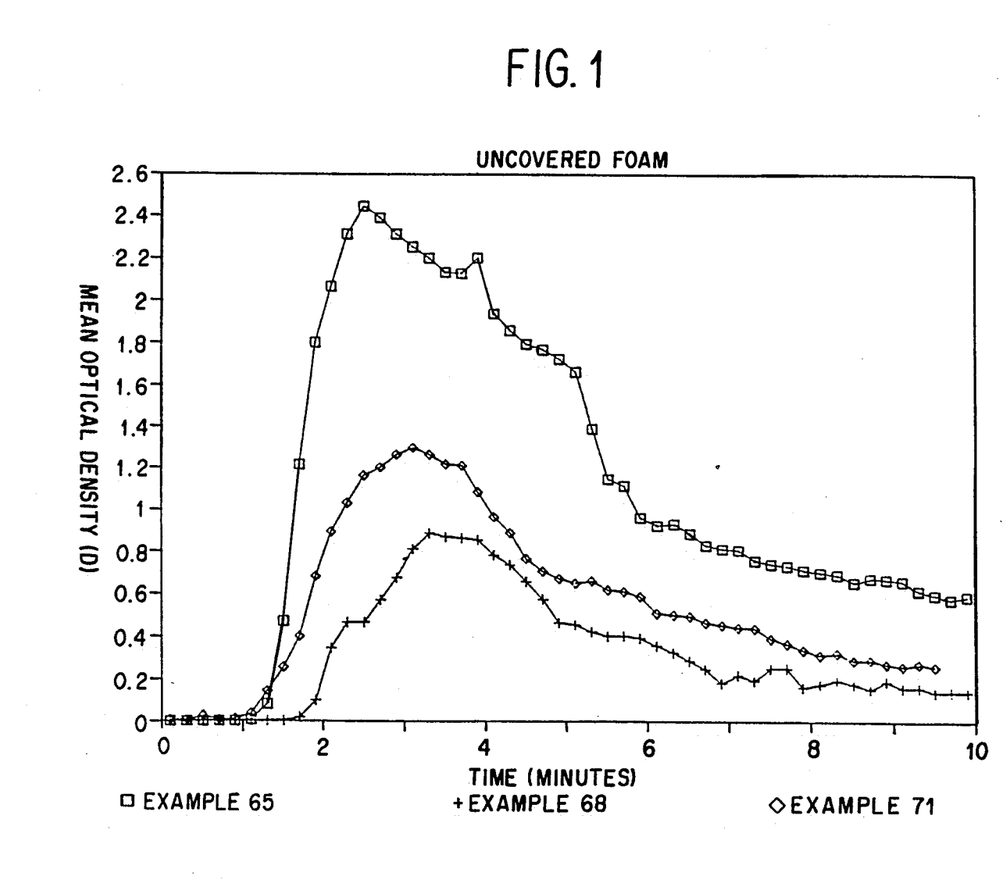
Figure 2:
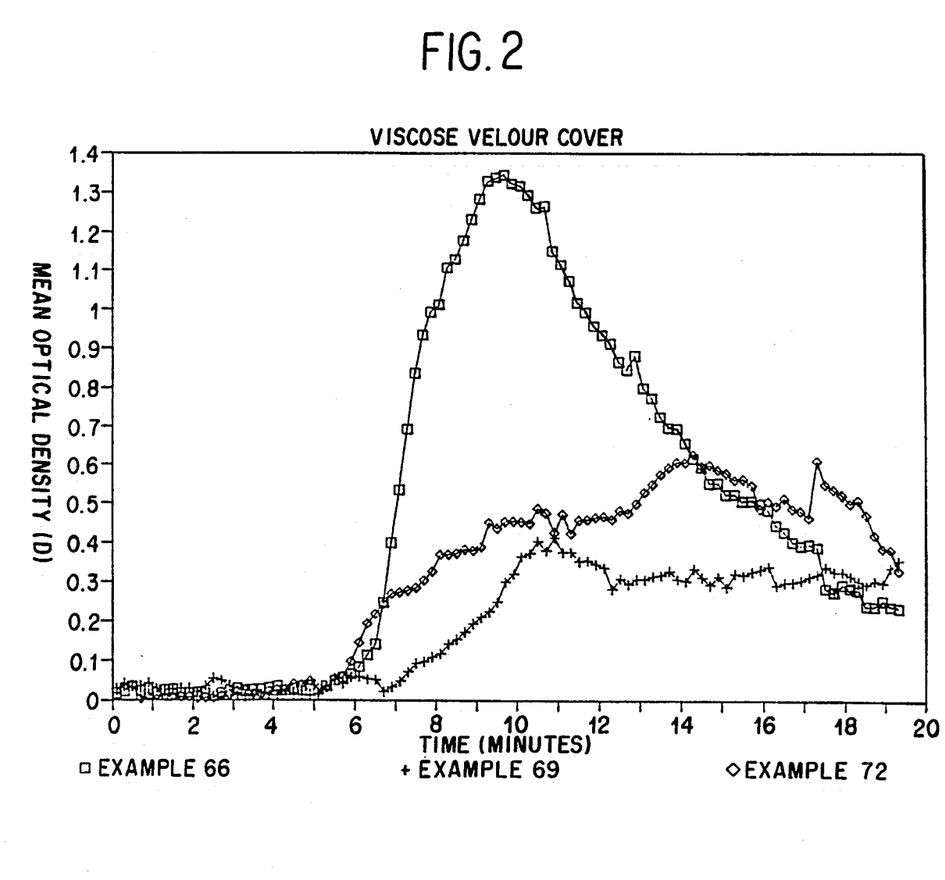
Figure 3:
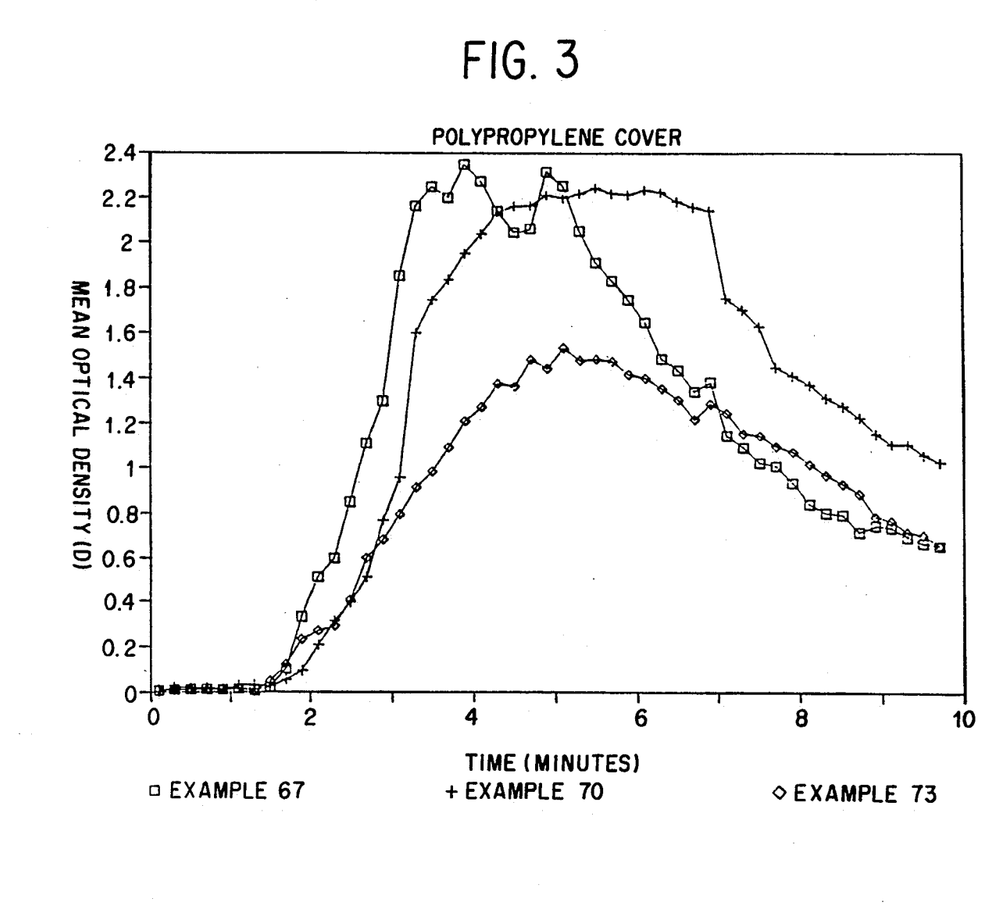
Figure 4:
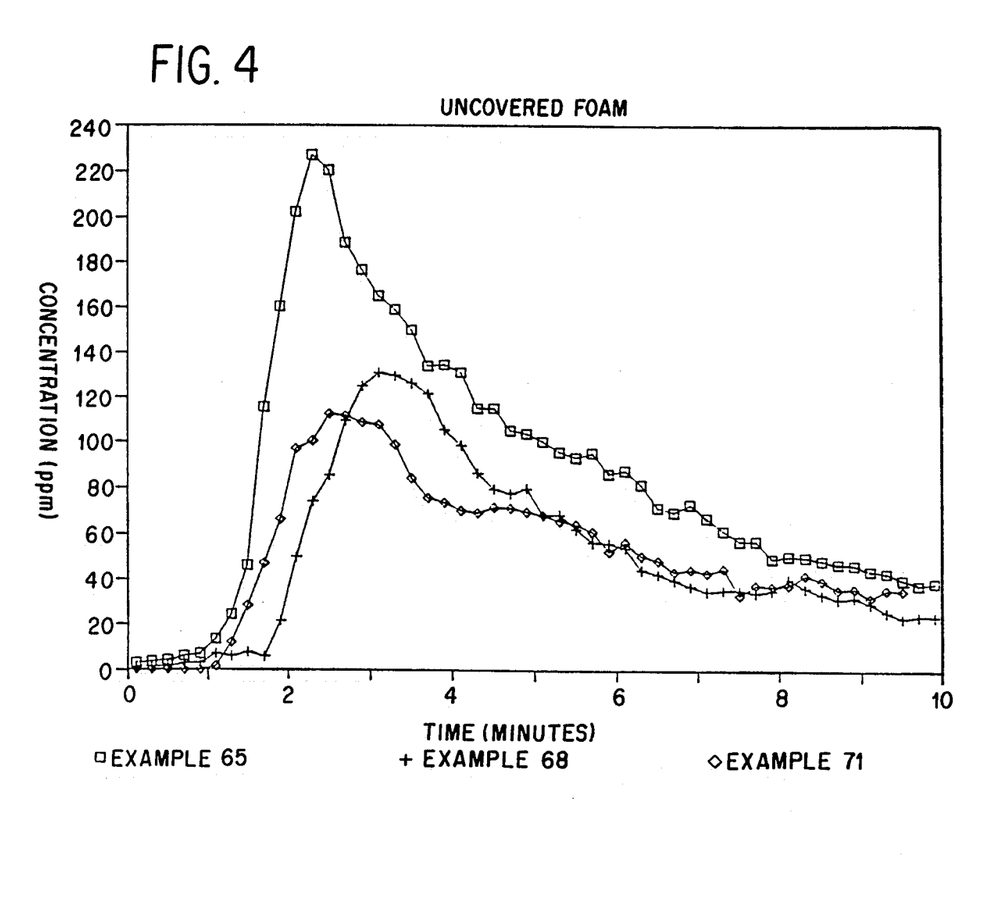
Figure 5:
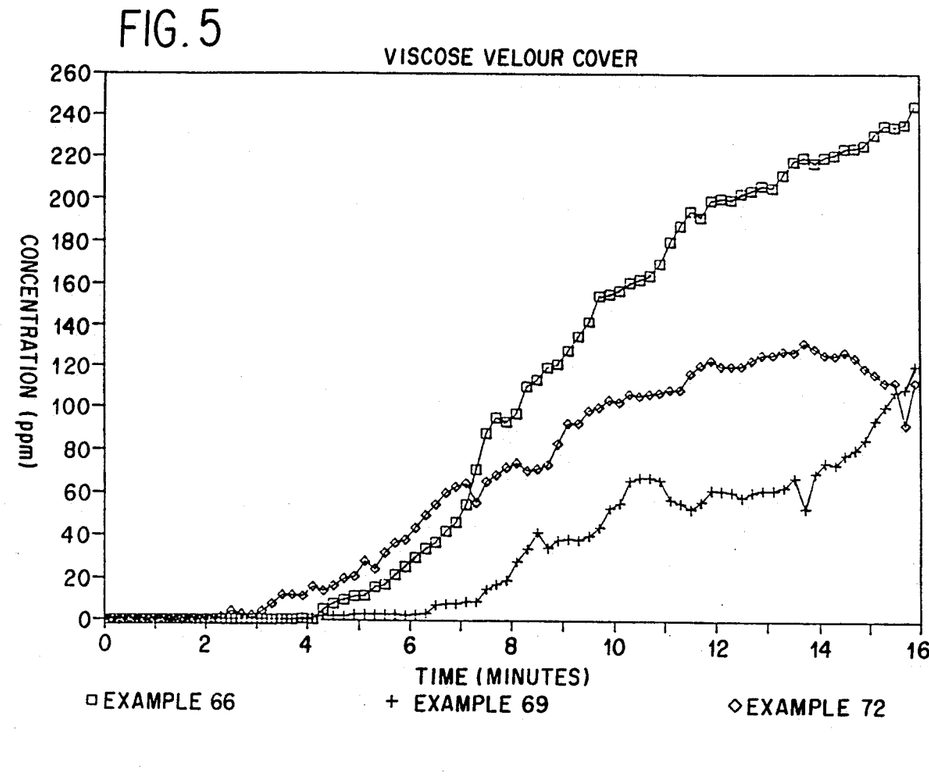
Figure 6:
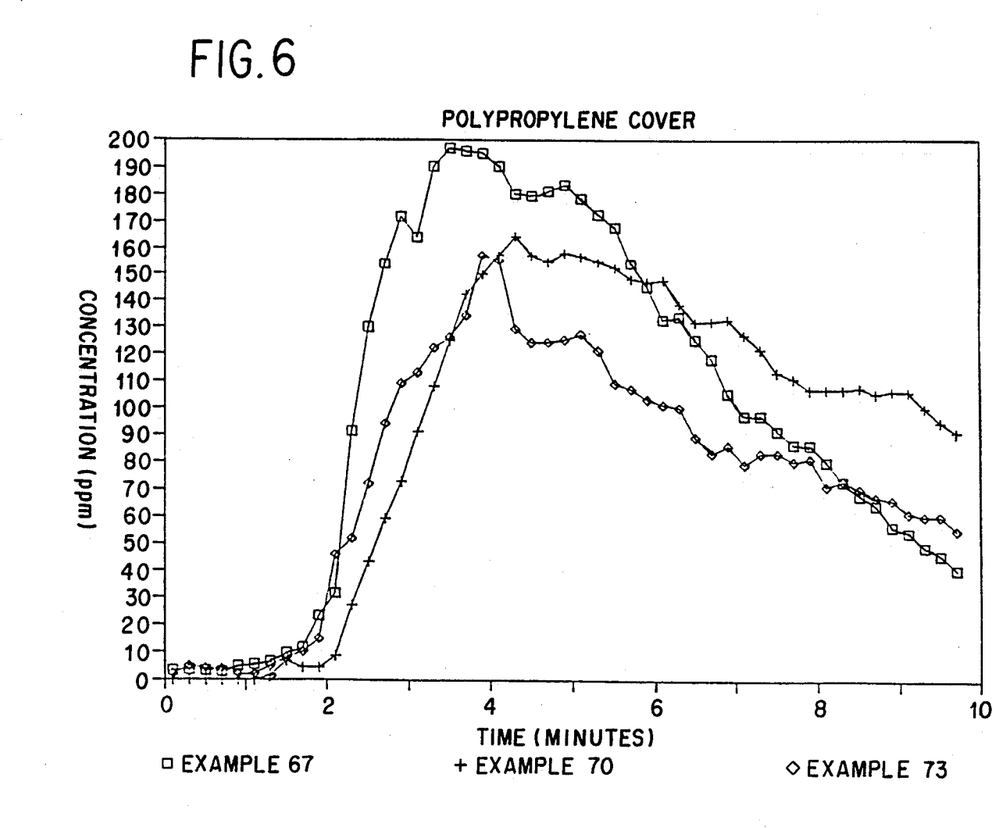

In addition a gas sampling line was routed into the observation room enabling continuous monitoring of oxygen, carbon monoxide and carbon dioxide levels in the chamber. The tests were carried out in triplicate. Mean values of smoke optical density (D) in the corridor are shown graphically in FIGS. 1–3. Carbon monoxide levels are given in FIGS. 4–6.

These results clearly show that incorporation of the polyester in the foam significantly reduces the rate of smoke production, the amount of smoke produced and the amount of carbon monoxide evolved. These reductions are observed with the combustion of uncovered foam and when either viscose velour or polypropylene covers are used.

TABLE 4

| Example No. | Formulation | Cover |
|---|---|---|
| 65 | A | None |
| 66 | A | Viscose Velour |
| 67 | A | Polypropylene |
| 68 | B | None |
| 69 | B | Viscose Velour |
| 70 | B | Polypropylene |
| 71 | C | None |
| 72 | C | Viscose Velour |
| 73 | C | Polypropylene |

EXAMPLES 74–77

Samples of flexible polyurethane foam containing the polyester composition of the present invention and other flame retardant additives are prepared using the method of Example 34. The polyester composition and other flame retardant are blended into the mixture prior to the addition of the stannous octoate and TDI. The amounts used are shown in Table 5 as parts per hundred parts of polyol (php).

| Example | Polyester of Example | Amount php | Flame Retardant | Amount php |
|---|---|---|---|---|
| 74 | 17 | 10 | Melamine borate | 20 |
| 75 | 1 | 20 | Melamine | 10 |

-continued

| Example | Polyester of Example | Amount php | Flame Retardant | Amount php |
|---------|---------------------|------------|-----------------|------------|
| 76 | 20 | 20 | Cyanuric acid | 10 |
| 77 | 1 | 10 | Zinc borate | 20 |

Samples of the foam are prepared and tested following the procedure given in Example 34 and the values of optical density thus obtained are given in Table 6.

TABLE 6

| Example | \multicolumn{4}{c}{Specific Optical Density} | | | |
|---------|-------|-------|-------|-------------|
| | $D_1$ | $D_2$ | $D_3$ | Dmax (corr) |
| 74 | 12 | 26 | 30 | 31 |
| 75 | 6 | 31 | 46 | 45 |
| 76 | 9 | 34 | 45 | 45 |
| 77 | 26 | 48 | 53 | 50 |

We claim:

1. A composition comprising a combustible material containing urethane linkages; and, as a smoke and toxic gas suppressant, a polyester which has an acid value below 30 mg KOH/g and which is derived from:

Ia. [A] a component which contains 4 carboxyl groups or anhydride thereof, or

Ib. a mixture of [A] and [B]:

[B] one or more components which contain 2 to 12 carboxyl groups or 1 to 6 carboxylic anhydride groups, selected from:

[$B_1$] an aliphatic carboxylic acid component containing 2-16 carbon atoms;

[$B_2$] a cyclic non-aromatic carboxylic acid containing 7-16 carbon atoms; and

[$B_3$] an aromatic carboxylic acid containing 8-16 carbon atoms; and

II. [C] at least one aliphatic, cycloaliphatic or aromatic polyhydroxyl component containing 2 to 8 hydroxyl groups.

2. A composition as claimed in claim 1 in which the combustible material is a polyurethane foam.

3. A composition as claimed in claim 1 in which the amount of polyester is from 5 to 100 % based on the weight of polyol used to make the polyurethane foam.

4. A composition as claimed in claim 3 in which the amount of polyester is from 10 to 30 %.

5. A composition as claimed in claim 1 in which the polyester has an acid value below 10 mg KOH/g.

6. A composition as claimed in claim 1 in which the polyester is derived from a component [A] which is an aromatic component.

7. A composition as claimed in claim 6 in which the component [A] is pyromellitic acid or pyromellitic dianhydride.

8. A composition according to claim 1 wherein component [B] is a saturated aliphatic or hydroxy-substituted saturated aliphatic carboxylic acid component [$B_1$].

9. A composition according to claim 8 wherein component [$B_1$] is a dicarboxylic acid.

10. A composition according to claim 8 wherein component [$B_1$] is adipic acid or adipic acid in admixture with other dicarboxylic acids, or [$B_1$] is malic acid.

11. A composition according to claim 1 wherein component [B] is an unsaturated dicarboxylic acid component [$B_1$].

12. A composition according to claim 11 wherein component [$B_1$] is maleic, fumaric or itaconic acid.

13. A composition according to claim 1 wherein component [B] is a cyclic non-aromatic component [$B_2$] containing four carboxyl groups.

14. A composition according to claim 13 wherein component [$B_2$] is tetrahydrofuran tetracarboxylic acid.

15. A composition according to claim 1 wherein component [B] is an aromatic component [$B_3$] containing 2 carboxyl groups.

16. A composition according to claim 15 wherein [$B_3$] is phthalic-, isophthalic- or terephtalic acid.

17. A composition according to claim 1 wherein component [C] is an aliphatic component.

18. A composition according to claim 17 wherein component [C] is an aliphatic diol or polyether diol.

19. A composition according to claim 17 wherein component [C] contains 2 to 6 carbon atoms 20. A composition according to claim 1 which also contains a fire retardant.

21. A composition according to claim 20 in which the fire retardant is selected from hydrated aluminas, magnesium hydroxide, halogen- and/or phosphorus-containing compounds, antimony oxides. boron-containing compounds, graphite, ceramics or melamine or a derivative thereof.

22. A composition according to claim 19 in which the ratio of polyester to fire retardant is from 10:90 to 90:10 by weight.

23. A method for suppressing smoke and toxic gas in a combustible material containing urethane linkages by incorporating a polyester into said material during its preparation, wherein the polyester is as defined in claim 1.

* * * * *